United States Patent [19]

Kurakake et al.

[11] Patent Number: 4,695,780
[45] Date of Patent: Sep. 22, 1987

[54] SERVOMOTOR VELOCITY CONTROL SYSTEM

[75] Inventors: Mitsuo Kurakake, Hino; Keiji Sakamoto; Yukio Toyosawa, both of Hachioji, all of Japan

[73] Assignee: Fanuc Ltd, Minamitsuru, Japan

[21] Appl. No.: 885,577

[22] PCT Filed: Nov. 7, 1985

[86] PCT No.: PCT/JP85/00620
§ 371 Date: Jul. 2, 1986
§ 102(e) Date: Jul. 2, 1986

[87] PCT Pub. No.: WO86/03074
PCT Pub. Date: May 22, 1986

[30] Foreign Application Priority Data

Nov. 9, 1985 [JP] Japan ............... 60-236475

[51] Int. Cl.$^4$ .................................. G05B 13/00
[52] U.S. Cl. ............................. 318/561; 318/615
[58] Field of Search ............. 318/561, 615, 616, 617, 318/618

[56] References Cited

U.S. PATENT DOCUMENTS 4,366,422 12/1982 Rhodes ..................... 318/616 X
4,491,776 1/1985 Veale ....................... 318/615 X
4,498,037 2/1985 Razavii .................... 318/561

Primary Examiner—Benjamin Dobeck
Attorney, Agent, or Firm—Staas & Halsey

[57] ABSTRACT

A servomotor velocity control system has an estimating unit (4) for obtaining an estimated value $\hat{V}$ of velocity based on rotary encoder position information ($\theta$), which includes a current ($I_L$) indicative of load torque, and motor current (I) of a servomotor (5). The system is adapted to obtain a torque command signal (U) based on the estimated value ( ) of velocity and a velocity comman signal ($V_c$).

3 Claims, 4 Drawing Figures

4,695,780

SERVOMOTOR VELOCITY CONTROL SYSTEM

BACKGROUND OF THE INVENTION

Field of the Invention

This invention relates to a system for controlling the velocity of a servomotor used in a machine tool, an industrial robot and the like.

SUMMARY OF THE INVENTION

When subjecting the velocity of a servomotor to feedback control, it is necessary to sense the actual velocity of the motor. An example of conventional means for sensing actual velocity is a rotary encoder for sensing position. The rotary encoder is adapted to generate from several thousand to 20,000 pulses per revolution of the motor, the frequency of these output pulses being proportional to the rotational velocity of the motor.

With a rotary encoder, however, the spacing between adjacent pulses becomes very wide and the pulses become discrete in nature, especially when the motor rotates at a low velocity. When these pulses are used as motor rotation information, irregular rotation is the result.

Thus, when it is attempted to employ a rotary encoder used for sensing position as means for sensing velocity, velocity resolution is poor in comparison with an analog sensor. For this reason, highly precise, smooth velocity control cannot be carried out.

DISCLOSURE OF THE INVENTION

An object of the present invention is to provide a servomotor velocity control system, in which when velocity is estimated by an estimating unit based on position information from a rotary encoder mounted on a servomotor, load torque, which is a cause of a steady-state estimating error, is estimated at the same time to enable smooth, highly precise velocity control.

According to the present invention, there is provided a servomotor velocity control system in which position information from a rotary encoder mounted on a servomotor driving a mechanical load is fed back and a torque command signal is produced for application to the servomotor. The system has an estimating unit for obtaining an estimated value of velocity of the servomotor based on position information from the rotary encoder, motor current of the servomotor and a load torque signal, and arithmetic means for calculating the torque command signal based on the estimated value of velocity outputted by the estimating unit and a velocity command signal.

In a case where the velocity of the servomotor is estimated by the estimating unit based on the position information from the rotary encoder, the servomotor velocity control system of the invention obtains the estimated value of velocity upon taking load torque, which is a cause of a steady-state estimating error, into account. This eliminates the shortcoming of the prior art, wherein the pulses from the rotary encoder become discrete when the servomotor is rotating at low velocity. This makes it possible to obtain a suitably interpolated value of estimated velocity and to control velocity in a highly accurate manner.

DESCRIPTION OF THE PREFERRED EMBODIMENT

Figure 1:
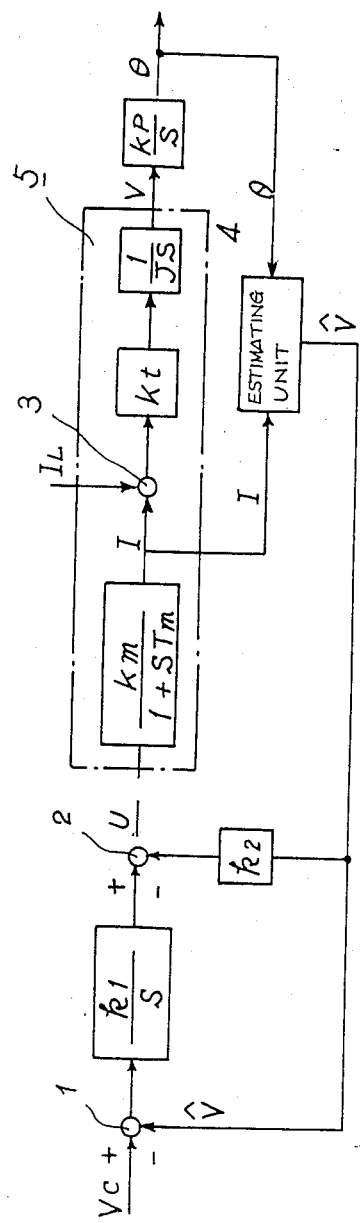
FIG. 1 is a block diagram of a velocity control system according to the invention.

The present invention will now be described in detail based on an embodiment illustrated in the drawings.

FIG. 1 is a block diagram of a velocity control system according to the present invention. Numerals 1 through 3 denote arithmetic units, 4 an estimating unit, namely an observer, and 5 a servomotor. $V_c$ represents a velocity command, U a torque command, I motor current and $I_L$ current indicative of a load torque. V represents the velocity of the servomotor, $\theta$ position, $k_1$ integration gain, $k_2$ feedback gain, $K_m$ a motor constant, and $T_m$ a ratio between $L_a$ and $R_a$, namely the value of $L_a/R_a$, where $R_a$ denotes motor winding resistance and $L_a$ represents inductance. Further, $K_t$ is a torque constant, J stands for the total inertia of the load and motor, and $K_p$ is a conversion coefficient decided by the rotary encoder. S represents d/dt. Further, the estimating unit per se is one commonly in use. An arrangement in which a velocity sensor is combined with the estimating unit has been proposed in Japanese Patent Application No. 59-55114.

The operation of the velocity control system according to the invention will now be described.

First, the arithmetic unit 1 produces an output indicative of the difference between the velocity command $V_c$ and an estimated value $\tilde{V}$ of velocity, described below. The output signal is integrated and then applied to the arithmetic unit 2. The result of multiplying the estimated value $\tilde{V}$ of velocity, described below, by the feedback gain $k_2$ is applied to the arithmetic unit 2, which outputs the difference between its two input signals as the torque command U, by which the motor 5 is controlled. The velocity of the motor 5 is outputted as V, and position $\theta$ is sensed by a rotary encoder. The information indicative of the position $\theta$ includes the results of adding the current $I_L$, which is indicative of the load torque (Coulomb friction), at the arithmetic unit 3.

In the present invention, the estimated value of velocity is obtained by using the estimating unit, namely the observer 4. At this time the load torque, which is a cause of a steady-state estimating error, is estimated simultaneously. Specifically, the position information $\theta$, which takes into account the motor current I and the current $I_L$ indicative of load torque, is applied to the estimating unit 4, which proceeds to output the estimated value V of velocity.

Let us describe this point in detail. If an identity observer is constructed for the motor current I, motor velocity V, position $\theta$ and current $I_L$ ascribable to torque, we will have $$\begin{bmatrix} \dot{\theta} \\ \dot{V} \\ \dot{I}_L \end{bmatrix} = \begin{bmatrix} 0 & Kp & 0 \\ 0 & 0 & -\frac{Kt}{J} \\ 0 & 0 & 0 \end{bmatrix} \begin{bmatrix} \theta \\ V \\ I_L \end{bmatrix} + \begin{bmatrix} 0 \\ \frac{Kt}{J} \\ 0 \end{bmatrix} I$$

What are actually sensed and applied to the estimating unit, namely the observer 4, are the motor current I and position $\theta$. An identity observer for digital processing is as follows:

$$\begin{bmatrix} \hat{\theta}_n + 1 \\ \hat{V}_n + 1 \\ \hat{I}_{Ln} + 1 \end{bmatrix} = \begin{bmatrix} 1 - \lambda_1 KpT - \frac{KpKt}{2J}T^2 & & \\ -\lambda_2 & 1 & -\frac{Kt}{J}T \\ -\lambda_3 & 0 & 1 \end{bmatrix} \begin{bmatrix} \hat{\theta}_n \\ \hat{V}_n \\ \hat{I}_{Ln} \end{bmatrix} +$$

$$\begin{bmatrix} \lambda_1 \\ \lambda_2 \\ \lambda_3 \end{bmatrix} \theta + \begin{bmatrix} \frac{Kp}{Z}T^2 \\ \frac{Kt}{J}T \\ 0 \end{bmatrix} I$$

where T is a sampling period and $\lambda_1, \lambda_2, \lambda_3$ are observer poles, which are decided by the number of convergence steps necessary.

In order to process the above by a microprocessor, the observer is implemented by the following algorithm:

$$\left. \begin{aligned} \Delta \hat{\theta}_{m+1} &= \lambda_1 \sum_{j=0}^{m} (\Delta \theta_j - \Delta \hat{\theta}_j) + KpT\hat{V}_m + \frac{KpKT}{2J}T^2(I_m - \hat{I}_{Lm}) \\ \hat{V}_{m+1} &= \hat{V}_m + \lambda_2 \sum_{j=0}^{m} (\Delta \theta_j - \Delta \hat{\theta}_j) + \frac{KtT}{J}(I_m - \hat{I}_{Lm}) \\ \hat{I}_{Lm+1} &= \hat{I}_{Lm} + \lambda_3 \sum_{j=0}^{m} (\Delta \theta_j - \Delta \hat{\theta}_j) \end{aligned} \right\} \quad (1)$$

Figure 2:
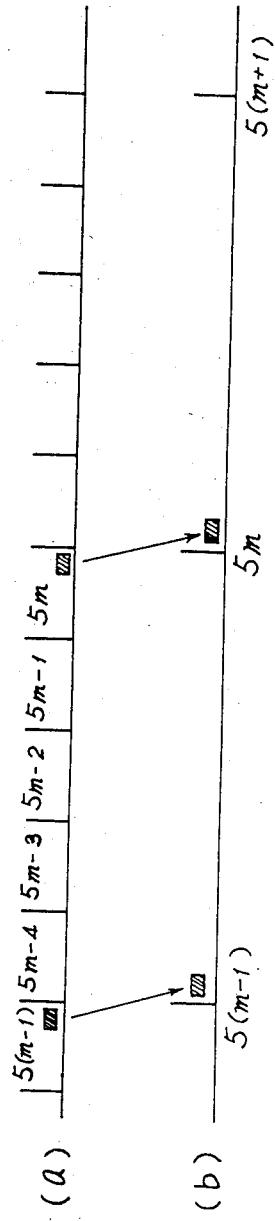
FIG. 2(a) is a view illustrating a motor current loop processing level.
FIG. 2(b) is a view illustrating a velocity processing level.

FIG. 2 is a view useful in describing information processing for obtaining the predicted velocity V. FIG. 2(a) is a view illustrating the processing level (j) of a motor current loop, and FIG. 2(b) is for describing a velocity processing level.

The observer 4 is equipped with a hardware counter for integrating a number of pulses $\Delta\theta$ which arrive from the rotary encoder in the sampling time period T. In this case, it is assumed that observer poles $\lambda_1, \lambda_2, \lambda_3$, which will bring an estimating error to zero in five steps, are calculated and given in advance.

Figure 3:
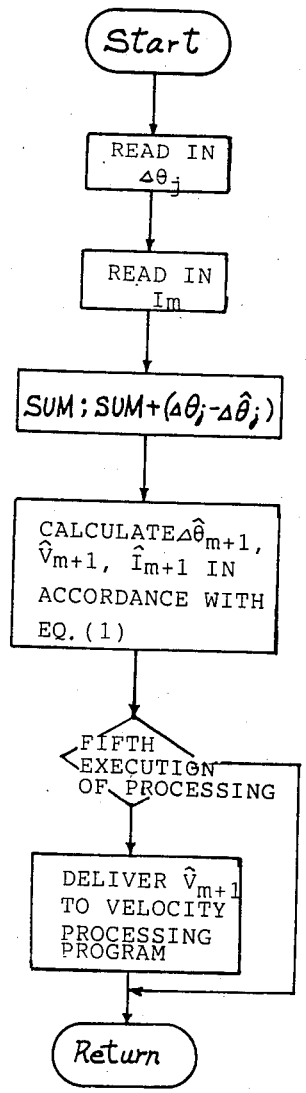
FIG. 3 is a flowchart illustrating observer processing at a motor current loop level.
Figure 4:
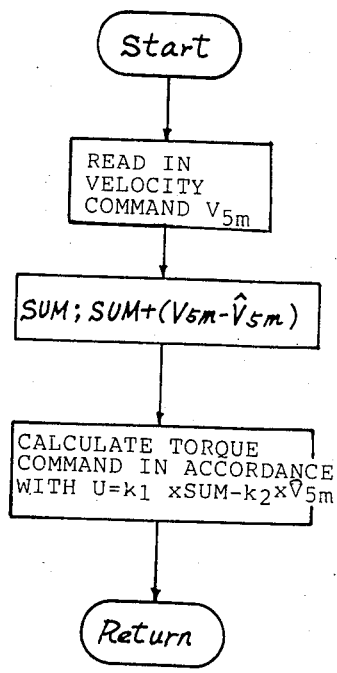
FIG. 4 is a flowchart illustrating velocity loop processing.

FIG. 3 illustrates a flowchart of processing performed by the observer at the motor current loop processing level. FIG. 4 illustrates a flowchart of velocity loop processing.

First, with regard to the motor current loop, the observer 4 reads in position information $\Delta\bar{\theta}j$ and motor current $I_m$. Next, these are integrated. Then, based on Eq. (1), the observer 4 calculates position estimation information $\Delta\hat{\theta}_{m+1}$, velocity estimation information $\hat{V}_{m+1}$ and current estimation information $\hat{I}_{Lm+1}$ indicative of load. When the observer 4 has performed this processing for the fifth time, the velocity estimation information $\hat{V}_{m+1}$ is delivered to a velocity processing program. This relationship is evident from FIGS. 2(a) and 2(b).

Next, in velocity loop processing as indicated by the flowchart of FIG. 4, the observer 4 first reads in velocity commands $V_{5m}$ and then integrates them. Next, the observer 4 multiplies the integrated value by the integration gain $k_1$ and subtracts from this product the product of velocity estimation information $\hat{V}_{5m}$ and feedback gain $k_2$, thereby obtaining the torque command $U_{5m}$.

Thus, according to the present embodiment, the estimating unit 4 obtains the estimated value $\hat{V}$ of velocity based on the position signal from the rotary encoder, which signal is inclusive of the current $I_L$ indicating load torque, and the motor current I of servomotor 5. This solves the shortcoming of the prior art, wherein the pulses become discrete in nature, as when the motor is rotated at a low velocity, and makes it possible to obtain a value of estimated velocity that is suitably interpolated. In other words, since load torque, which causes a steady-state estimating error, can be estimated simultaneously, smooth, highly precise velocity control can be carried out even while employing a digital control system that exhibits a velocity resolution poorer than that of an analog control system.

Though the present invention has been described based on the illustrated embodiment, the invention is not limited solely to the embodiment but can be modified in various ways in accordance with the gist of the invention, such modifications being within the scope of the claims.

As set forth above, the present invention makes possible highly precise velocity control even at a low servomotor velocity. The invention is particularly well-suited to velocity control of servomotors for operating a machine tool bed or industrial robot, which require to be controlled in a precise manner.

We claim:

1. A servometer velocity control system in which a position signal from a rotary encoder mounted on a servomotor driving a mechanical load is fed back and a torque command signal is produced for application to the servomotor, the system comprising:
   an estimating unit for obtaining an estimated value of velocity of the servomotor based on the position signal from the rotary encoder, motor current of the servomotor and a load torque signal, and
   arithmetic means for calculating the torque command signal based on the estimated value of velocity outputted by said estimating unit and a velocity command signal.

2. A servometer velocity control system according to claim 1, wherein the position signal from the rotary encoder includes the load torque signal.

3. A servometer velocity control system according to claim 1, wherein said arithmetic means has a first arithmetic unit for calculating a difference between the velocity command signal and the estimated value of velocity, and a second arithmetic unit for outputting the torque command signal based on an output value from said first arithmetic unit and the estimated value of velocity.

* * * * *

UNITED STATES PATENT AND TRADEMARK OFFICE
CERTIFICATE OF CORRECTION

PATENT NO. : 4,695,780
DATED : September 22, 1987
INVENTOR(S) : Mitsuo Kurakake, Keiji Sakamoto; Yukio Toyosawa It is certified that error appears in the above-identified patent and that said Letters Patent is hereby corrected as shown below:

[56] "Razavii" should be -- Razavi --.
[57] Line 1, "estimiat-" should be -- estimat- --.
[57] Line 2, "($\bar{V}$)" should be -- $(\hat{V})$.
[57] Line 7, "()" should be -- $(\hat{V})$"
Column 1, line 10, "SUMMARY OF THE INVENTION" should be -- DESCRIPTION OF THE RELATED ART --.
Column 1, line 34, "DISCLOSURE OF THE INVENTION" should be -- SUMMARY OF THE INVENTION --.
Column 2, line 4, "." should be --;--.
Column 2, line 64, "V" should be -- "$\hat{V}$" --.
Column 3, line 48, "V" should be -- "$\hat{V}$" --.
Column 3, line 50, "is for describing" should be -- illustrates --.

UNITED STATES PATENT AND TRADEMARK OFFICE
CERTIFICATE OF CORRECTION

PATENT NO. : 4,695,780

DATED : September 22, 1987

INVENTOR(S) : Mitsuo Kurakake, Keiji Sakamoto; Yukio Toyosawa

It is certified that error appears in the above-identified patent and that said Letters Patent is hereby corrected as shown below:

Column 3, line 63, "$\Delta \hat{\Theta} j$" should be --$\Delta \Theta\ j$--.

Signed and Sealed this

Twenty-fourth Day of May, 1988

*Attest:*

DONALD J. QUIGG

*Attesting Officer*  *Commissioner of Patents and Trademarks*